United States Patent
Söchtig

(10) Patent No.: US 8,070,478 B2
(45) Date of Patent: Dec. 6, 2011

(54) MOULD WITH AN INTEGRATED INJECTOR

(75) Inventor: Wolfgang Söchtig, Germering (DE);
Elisabeth Karolina Söchtig, legal representative, Germering (DE); Melanie Söchtig, legal representative, Germering (DE); Stephanie Söchtig, legal representative, Germering (DE)

(73) Assignee: KraussMaffei Technologies GmbH, München (DE)

( * ) Notice: Subject to any disclaimer, the term of this patent is extended or adjusted under 35 U.S.C. 154(b) by 25 days.

(21) Appl. No.: 12/682,159

(22) PCT Filed: Oct. 17, 2008

(86) PCT No.: PCT/EP2008/063444
§ 371 (c)(1),
(2), (4) Date: Apr. 8, 2010

(87) PCT Pub. No.: WO2009/050082
PCT Pub. Date: Apr. 23, 2009

(65) Prior Publication Data
US 2010/0330226 A1     Dec. 30, 2010

(30) Foreign Application Priority Data
Oct. 18, 2007   (DE) .......................... 10 2007 050 332

(51) Int. Cl.
*B29C 45/23* (2006.01)
(52) U.S. Cl. ....................................... 425/564; 425/549
(58) Field of Classification Search .................. 425/549, 425/562, 563, 564, 565, 566
See application file for complete search history.

(56) References Cited

U.S. PATENT DOCUMENTS

| | | | |
|---|---|---|---|
| 3,797,984 A * | 3/1974 | Yago et al. .................... | 425/543 |
| 4,443,177 A | 4/1984 | Modur et al. | |
| 4,979,892 A * | 12/1990 | Gellert ........................... | 425/549 |
| 5,000,675 A * | 3/1991 | Gellert et al. ................. | 425/549 |
| 5,082,437 A | 1/1992 | Matsushita et al. | |

FOREIGN PATENT DOCUMENTS

| | | |
|---|---|---|
| DE | 23 64 501 | 7/1975 |
| DE | 10 2005 007 979 | 8/2006 |
| EP | 0 108 287 A | 5/1984 |
| GB | 1 492 406 | 11/1977 |
| JP | 59 014932 | 1/1984 |
| WO | WO 94/23924 | 10/1994 |

* cited by examiner

*Primary Examiner* — Timothy Heitbrink
(74) *Attorney, Agent, or Firm* — Henry M. Feiereisen; Ursula B. Day

(57) ABSTRACT

The present invention relates to a mould, in which a completely closed cavity can be formed in one operating state, comprising an injector (10) which is at least partially accommodated in the mould (14) and the discharge opening of which opens into the closed cavity. According to the invention, the injector is designed with a material feed duct (30) and a material return duct (34), wherein the two ducts (30, 34) open into a connecting chamber (32) in the region of the tip of the injector (10) and are flow-connected to one another via said connecting chamber (32). In this case, an injector needle (36) can be switched into at least two operating positions, wherein, in one moved-forward operating position, the discharge opening is closed by means of the tip (38) of the injector needle (36) and, in the other, pulled-back operating position, the discharge opening is flow-connected to the connecting chamber, and the injector (10) is therefore open.

19 Claims, 4 Drawing Sheets

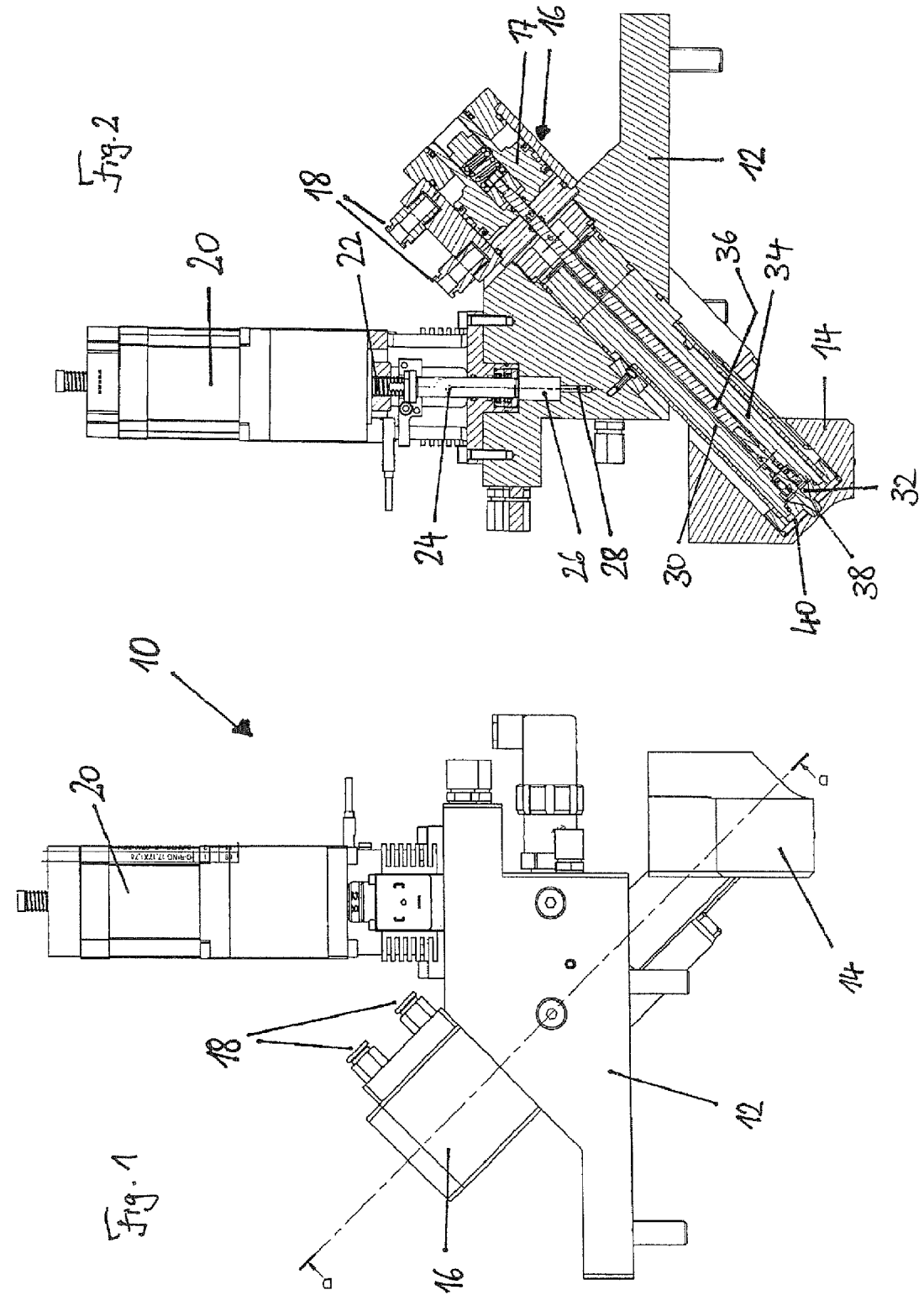

MOULD WITH AN INTEGRATED INJECTOR

CROSS-REFERENCES TO RELATED APPLICATIONS

This application is the U.S. National Stage of International Application No. PCT/EP2008/063444, filed Oct. 17, 2008, which designated the United States and has been published as International Publication No. WO 2009/050082 and which claims the priority of German Patent Application, Serial No. DE102007050332.8, filed Oct. 18, 2007, pursuant to 35 U.S.C. 119(a)-(d).

BACKGROUND OF THE INVENTION

The present invention relates to a mould.

It has been known for a long time to fill cavities of injection moulds with a thermoplast material by means of an injection process. Moreover, it has been known for some time to fill cavities of closed moulds by injection of low-viscous materials, for example polyurethane, in order to thus produce surfaces, decorations or skins.

In a known embodiment, a carrier element, consisting for example of a thermoplast material, is inserted into an enlarged cavity, so that a free space, which is closed off with respect to the exterior environment, still remains between the carrier element and a cavity wall. If a low-viscous material is introduced in this space and the cavity is completely filled, then through this flooding process a coating of the carrier component is produced. Such flooding processes are likewise known from the prior art. With the use of polyurethane as flooding material, mixing heads are used here, in which the reactive starting materials polyol and isocyanate are mixed with each other before the injecting. The respective mixing head is docked directly onto the mould or the introduction opening, and the reactive mixture is introduced into the cavity chamber through the mixing head.

SUMMARY OF THE INVENTION

It is an object of the present invention to indicate a mould by which in particular products inserted into an enlarged cavity can be flooded or coated.

This problem is solved by a mould, in which a completely closed cavity is able to be formed in an operating state, with an injector, which is at least partially accommodated in the mould, and the discharge opening of which opens into the closed cavity, wherein the injector has a material feed duct and a material return duct, both ducts open in the region of the tip of the injector into a connecting chamber and are in flow connection with each other via this connecting chamber, wherein an injector needle is switchable in at least two operating positions, in one operating position the discharge opening is closed by means of the tip of the injector needle and in the other operating position the discharge opening has a flow connection with the connecting chamber and the injector is thereby opened.

A central idea of the present invention is to be seen in that an injector is able to be integrated at least partially into a mould, wherein in the closed mould a cavity is formed or is able to be formed which is completely closed with respect to the external environment. The discharge opening of the injector opens here directly or indirectly into the closed cavity. The injector is constructed here so that it can be operated both in an injection operation and also in a recirculation operation. A material feed duct and a material return duct are flow-connected with each other here via a connecting chamber. If an injector needle of the injector is now arranged in an open position, drawn back for example, then the connecting chamber is flow-connected with the outlet opening, and the coating material can arrive into the cavity (for example for the flooding) via the material feed duct, the connecting chamber and the discharge opening. In a closed position, the injector needle impinges on the discharge opening and closes it, so that the material now flows to a container via the material return duct.

According to an advantageous embodiment, a switchable valve is arranged in the supply line downstream of the injector. When this switchable valve is closed, the material can only emerge via an open injector. If the injector needle is in the closed position and the valve downstream of the injector is open, then a recirculation of the material back to the container is possible.

A recirculation is useful in particular when a reactive or cross-linking material is used as coating material, which could clog the nozzles without recirculation.

It is in fact possible in principle that the material is drawn into the cavity by an underpressure, for example by a so-called vacuum flooding method. It is certainly advantageous, however, if the material for the flooding or coating is also acted upon by pressure. For this, a pump could be provided before the injector with regard to flow.

A relatively simple possibility is the realization of the pump as a piston pump with a single piston which plunges into a cylinder arrangement. According to a preferred embodiment, the piston is driven by an electric motor with intercalation of a spindle-nut combination. The quantity which is introduced into the cavity can also be controlled by the operation of the motor.

If a further valve is arranged in the supply line in front of the pump with regard to flow, then by alternate switching of the valves and opening of the injector, a switchover can be carried out in a simple manner between the recirculation operation and the injection operation. This will be described more precisely in the example embodiment.

The injector is advantageously received and held in a base housing which is fastened to the mould and/or to the clamping plate. The mould can thereby be constructed integrally, as it were, with the injector, so that the mould and the injector form one unit. The base housing can be constructed in one or several parts. It is also possible to provide different housings for different units, for example one housing for the injector and one housing for the pump/valve combination.

A particularly compact type of construction is achieved when a portion of the pump and also the feed lines and the switchable valves are at least partially integrated in the base housing.

Depending on the material which is used, it is possibly useful or even necessary to temper the injector itself, for example to cool it or heat it. For this, the injector has corresponding tempering ducts and connections for the tempering medium, which are connected with these tempering ducts.

A particularly preferred embodiment is characterized in that a tempering element, for example a cooling element, is intercalated between the injector and the mould. A Peltier element is possible for example as such a tempering element, which cools the injector on the one side and heats the mould on the other side. Both functions, i.e. both the cooling and the heating have a particularly optimal effect. The cooling leads to particular materials which are to be used as far as possible not fully reacting in the injector. On the other hand, the heating of the mould leads to the reaction- or hardening process in the cavity occurring as quickly as possible. It is also possible to arrange several Peltier elements, as it were, in series one behind the other, so that the temperature different between the cold and the hot side can be selected to be great.

According to a preferred embodiment of the invention, the injection needle is embodied so that in the closed position the end face of the tip of the injection needle terminates flush with the cavity surface and, as it were, forms a part of this cavity surface.

BRIEF DESCRIPTION OF THE DRAWING

A concrete example of the present invention is explained in further detail below with the aid of the enclosed drawings. The drawings show in FIG. 1 a diagrammatic side view of an injector, integrated with a partially illustrated mould, FIG. 2 a diagrammatic sectional illustration along the line B-B of FIG. 3, FIG. 3 a top view onto an injector as illustrated in FIG. 1, FIG. 4 a section according to the line D-D of FIG. 1, FIG. 5 a flow diagram with the injector illustrated in FIGS. 1 to 4 and FIG. 6 an enlarged partial section illustration of the nozzle tip in a variant embodiment.

DETAILED DESCRIPTION OF PREFERRED EMBODIMENTS

Figure 4:
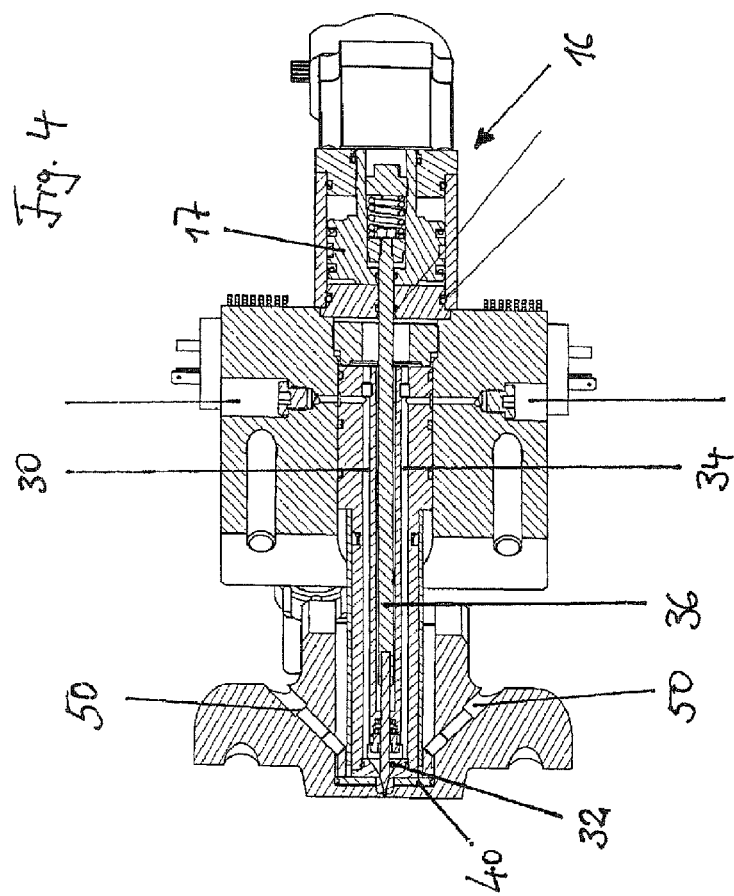
Figure 3:
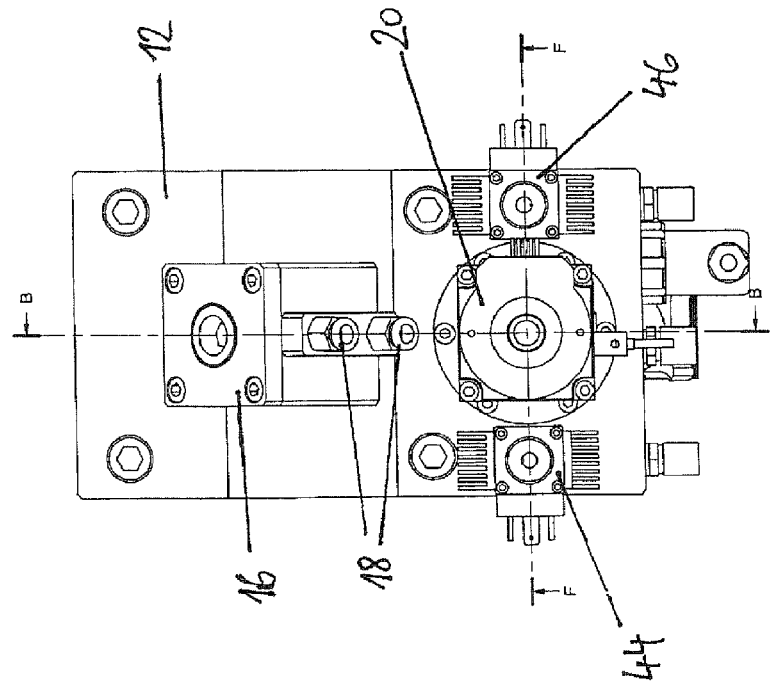

In FIGS. 1 to 4, a base plate 12 can be seen, in which an injector 16 is held securely in an opening, with an accurate fit and sealed accordingly. The injector 16 comprises a substantially cylindrical housing with a drive block arranged on the end face, in which a piston 17, actuatable by means of a fluid, is displaceable to and fro. The fluid is supplied via the two fluid connections 18. Depending on the impingement, the piston can be moved to and fro between two extreme positions. In FIG. 2 it can be seen that the piston is spring-loaded in the drive region of the injector. The pre-stressing for the injector needle can be adjusted by this spring or the screw (setscrew) which is likewise illustrated.

The piston 17 is directly connected with an injector needle 36, which can likewise be displaced in two positions under actuation of the piston 17. Running parallel to the piston, inside the housing of the injector 16, are firstly a material feed bore 30 and a material return bore 34, which open respectively into a connecting chamber 32 in the front region, via which a flow connection is produced between the two ducts 30 and 34. The injector needle 36 projects through this connecting chamber 32, and its tip 38 sits in its moved-forward state on a discharge opening, which in the open injector needle state has a direct connection to the connecting chamber 32. As can be seen in particular in FIG. 2, the front part of the injector 16 projects into a mould 14, which is only partially illustrated here, and ends not far from the cavity surface, wherein the discharge opening opens into the closed cavity, which is not further illustrated.

In order to be able to achieve a cooling of the injector 16, the injector is penetrated by cooling ducts which are not further illustrated here. A disc-shaped Peltier element 40 is arranged, likewise for cooling, between the front end of the injector 16 and the mould 14, said Peltier element cooling on the injector side and heating on the tool side under correspondingly electrical application. If the temperature difference between the hot and cold sides is desired to be greater, then it is also possible to arrange more than one Peltier element 40 and to connect these in series, as it were, with regard to temperature.

Two electro-valves 44 and 46 are arranged on the one hand on the base housing 12, and a piston pump 20 is arranged therebetween. The piston pump 20 is defined together with the corresponding embodiment of the base plate 12. The mode of operation thereof can be seen in particular from FIG. 2. The piston pump 20 namely has an electric motor in the upper region, which drives a spindle 22 rotatably. With the intercalation of a nut, the rotary movement is converted into an axial feed or withdrawal movement, so that a piston 24 connected with the spindle moves into an accurately fitting recess 26 of the base housing or moves out therefrom. The piston 24 and the recess 26 define a piston cylinder function. The coating material can arrive via the feed and removal duct 28 both into the cylinder chamber 26 (drawn in) or respectively can be displaced therefrom. The precise mode of operation will be further explained later by means of the stream- and flow diagram.

The base housing 12 together with the components, arranged thereon, and the injector 16, forms the flooding unit 10.

Figure 5:
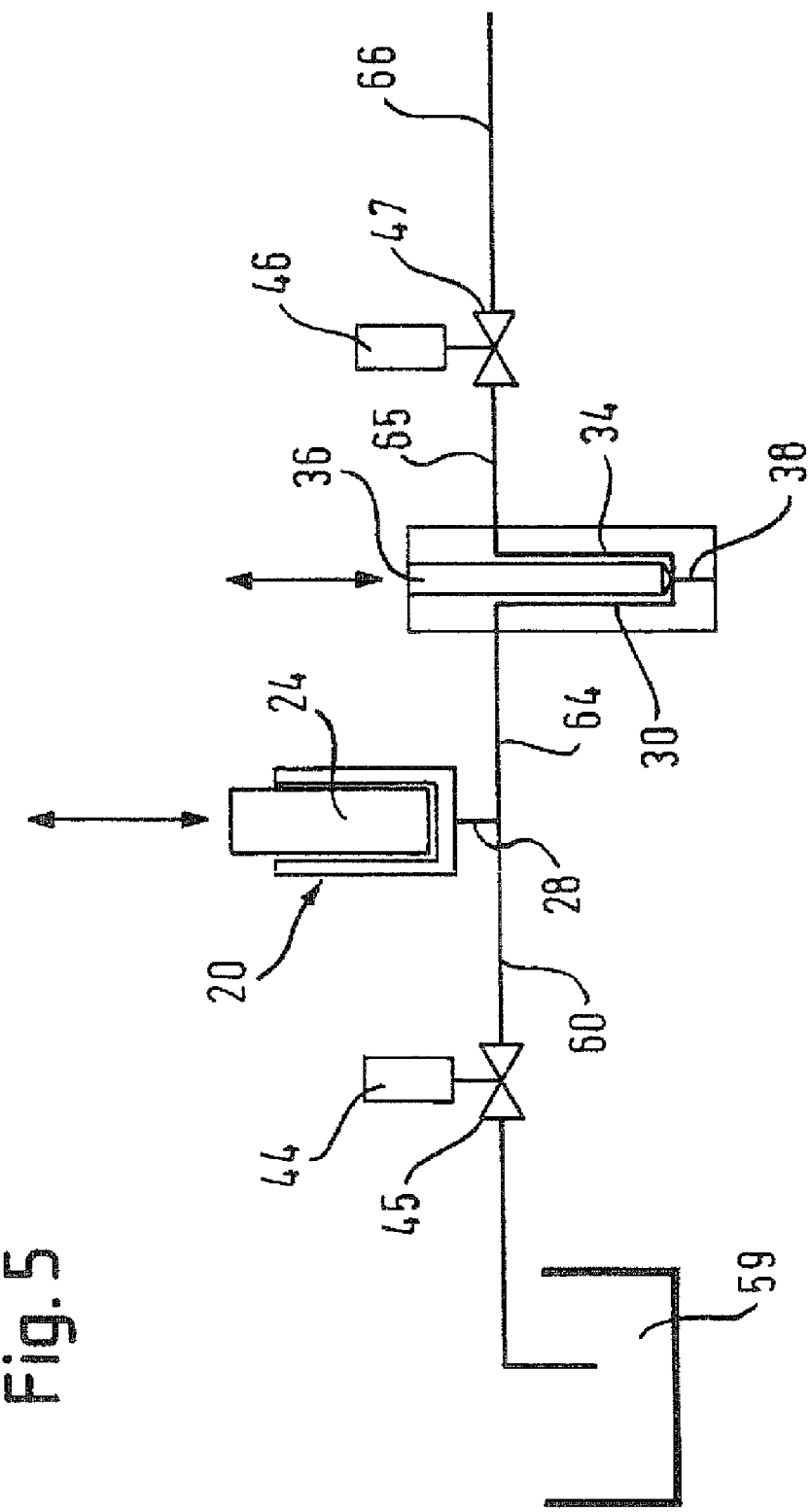

Furthermore—not illustrated in detail in the figures (however, cf. the flow plan in FIG. 5)—the line 28 is connected with the material feed line 30. In addition, a flow connection exists between the valve 45 and the piston pump 20 and finally also between the injector and the valve 47. The valve 45 is connected with a container 59 via a line, and the line 66 leading away from the valve 47 is likewise returned to the container 59.

Figure 6:
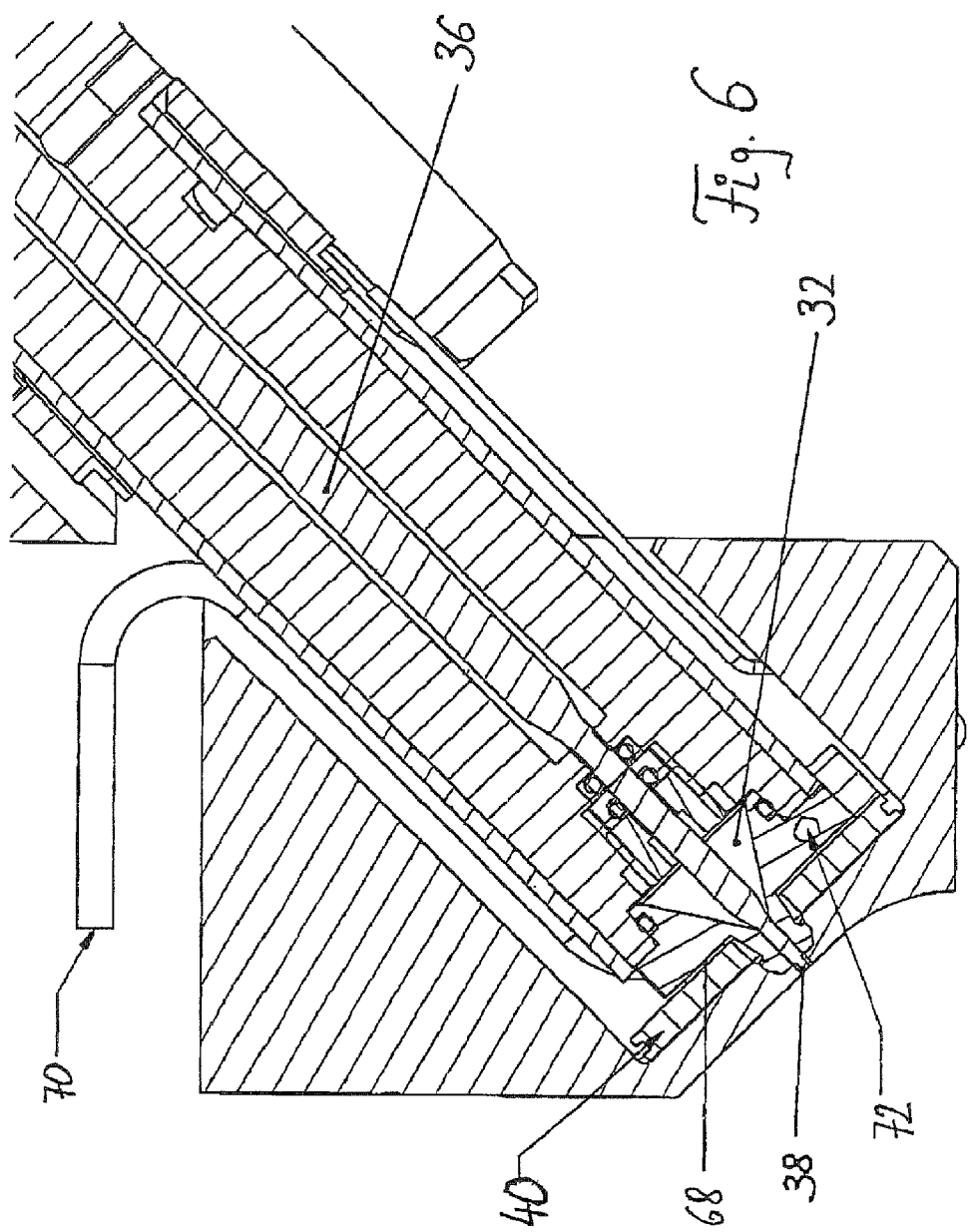

According to the embodiment shown in FIG. 6, the Peltier element is spaced slightly apart from the injector on its cold side and merely lies on its warm side on the tool side. Furthermore, cooling ducts are worked in in the region of the tip of the injector, only one of which is shown in FIG. 6 with the reference number 72. These cooling ducts are acted upon via a coolant supply 70 with a coolant, preferably water. If several cooling or tempering ducts are arranged in the injector tip or in the rest of the injector, these can be supplied independently with tempering medium. It has been found in tests that it is advantageous to provide the nozzle tip with a cooling (possibly a separate cooling), because otherwise the danger exists that the material which is used, for example an acrylic material, fully reacts in the region of the needle tip.

The mode of operation of the device is now conceivably simple.

If the injector 16 is closed by the nozzle needle 36, which has been moved forward, and if the valve 47 is also closed, with the valve 45 open and with a drawing back of the piston 24, the coating material can be drawn out of the container 59 via the line 60 into the cylinder chamber 26. The valve 45 is now closed.

Depending on whether an injection step or a recirculation step is to be carried out, either the injector 16 is opened by moving the injector needle 36 back, or else the valve 47 is opened by corresponding actuation of the electromagnet 46.

In the first case, namely with the closed valve 47 and open injector, on the downward moving of the piston 24 the material situated in the cylinder chamber 26 is injected into the cavity via the lines 28 and 64 and the material feed line 30 and the connecting chamber 32 and also the discharge opening. When the injection process is finished, the injector 10 is closed by the forward movement of the injector needle. The remaining material in the cylinder chamber 26 can now be returned to the container 59, with the open valve 47, via the return line 34 and the lines 65 and 66. If the injector is closed longer, then the pump 20 can continue to be operated with alternating opening of the valves 45 and 47, so that a constant recirculation flow exists.

This allows, as a whole, a very simple development of an injector for a cross-linking or reactive material. Moreover, the injection nozzle or respectively the injector is integrated in the mould.

The invention claimed is:

1. A mould assembly, comprising:
a mould defining a cavity which is completely closeable in an operating state;
an injector at least partially accommodated in the mould and having a discharge opening which opens into the closed cavity, said injector including an injector needle having cavity-proximal tip, a material feed duct, and a material return duct, wherein the material feed and return ducts port in a region of the cavity-proximal tip into a connecting chamber so as to be in flow connection with each other via the connecting chamber, said injector needle being switchable to move between a first operating position in which the discharge opening is closed by the tip of the injector needle as the tip sits on the discharge opening, and a second operating position in which the injector needle is lifted from the discharge opening so that the discharge opening has a flow connection with the connecting chamber, thereby opening the injector.

2. The mould assembly of claim 1, further comprising a supply line in flow communication with the material return flow duct, and a first switchable valve disposed downstream of the material return flow duct in the supply line.

3. The mould assembly of claim 2, further comprising a pump disposed upstream of the material feed duct.

4. The mould assembly of claim 3, wherein the pump is a piston pump.

5. The mould assembly of claim 4, wherein the piston pump has a cylinder and a piston received in the cylinder, and further comprising a spindle-nut combination driven by an electric motor for actuating the piston.

6. The mould assembly of claim 5, further comprising a second switchable valve disposed upstream of the pump in a supply line in flow communication with the cylinder.

7. The mould assembly of claim 6, wherein the first and second valves are constructed to be switchable electrically, pneumatically or hydraulically.

8. The mould assembly of claim 1, further comprising a base housing accommodating the injector and fastened to the at least one member selected from the group consisting of the mould and a clamping plate.

9. The mould assembly of claim 8, further comprising a pump disposed upstream of the material feed duct, and a feed line in flow communication with the material feed duct, wherein the pump and the feed line are constructed in the base housing.

10. The mould assembly of claim 7, further comprising a base housing accommodating the injector and fastened to the at least one member selected from the group consisting of the mould and a clamping plate, wherein the first and second valves are integrated in the base housing.

11. The mould assembly of claim 1, wherein the injector is constructed to be coolable.

12. The mould assembly of claim 1, further comprising a cooling element intercalated between the injector and the mould.

13. The mould assembly of claim 12, wherein the cooling element is a Peltier element.

14. The mould assembly of claim 12, wherein the cooling element is spaced at least slightly apart from the injector.

15. The mould assembly of claim 11, wherein the injector is constructed to include at least one cooling duct in the tip of the injector.

16. The mould assembly of claim 15, wherein the at least one cooling duct in the tip of the injector is able to be acted upon independently by a coolant.

17. The mould assembly of claim 11, wherein the injector is coolable with water.

18. The mould assembly of claim 16, wherein the coolant is water.

19. The mould assembly of claim 1, wherein the tip of the injection needle in the first operating position closes off the discharge opening flush with a cavity surface.

* * * * *